UNITED STATES PATENT OFFICE.

HEINRICH WÄCHTER, OF BIELEFELD, GERMANY.

BLEACHING COMPOUND.

SPECIFICATION forming part of Letters Patent No. 659,719, dated October 16, 1900.

Application filed January 3, 1898. Serial No. 665,457. (No specimens.)

*To all whom it may concern:*

Be it known that I, HEINRICH WÄCHTER, a subject of the King of Prussia, German Emperor, and a resident of Bielefeld, in the Province of Westphalia, German Empire, have invented a new and useful Substance for Bleaching Linen, Cotton, and other Articles, (for which a patent has been obtained in France, No. 222,465, dated June 17, 1897,) of which the following is an exact specification.

This invention relates to bleaching substances or mixtures, and has for its object to improve the composition of such mixtures by the substitution of other constituents of such bleaching mixtures than those hitherto employed.

In my invention I use a composition of caustic lime, soda, and zinc in a powdered state, with or without an addition of salt. The percentage for the ingredients is the following: 29.5 per cent. of soda, ninety-eight per cent.; 29.5 per cent. of salt, 29.5 per cent. of water, 7.5 per cent. of caustic lime, two per cent. of zinc, and two per cent. of potato-starch; total, one hundred per cent. This composition is boiled in water and a quantity of potato-starch is added, by means of which the composition is brought into a form of paste and the corroding qualities of the composition are removed.

Having thus fully described the nature of my said invention, what I desire to secure by Letters Patent of the United States is—

As a new preparation of manufacture, a new substance for bleaching linen, cotton and the like articles, consisting in a solution of zinc in alkalies, to which potato-starch is added, for the purpose as set forth.

In testimony whereof I have signed this specification in the presence of two subscribing witnesses.

HEINRICH WÄCHTER.

Witnesses:
  KARL WÄCHTER,
  LEONORE RASCH.